Aug. 13, 1957     J. W. BAYMILLER ET AL     2,802,765
SURFACE COVERING
Filed April 27, 1956
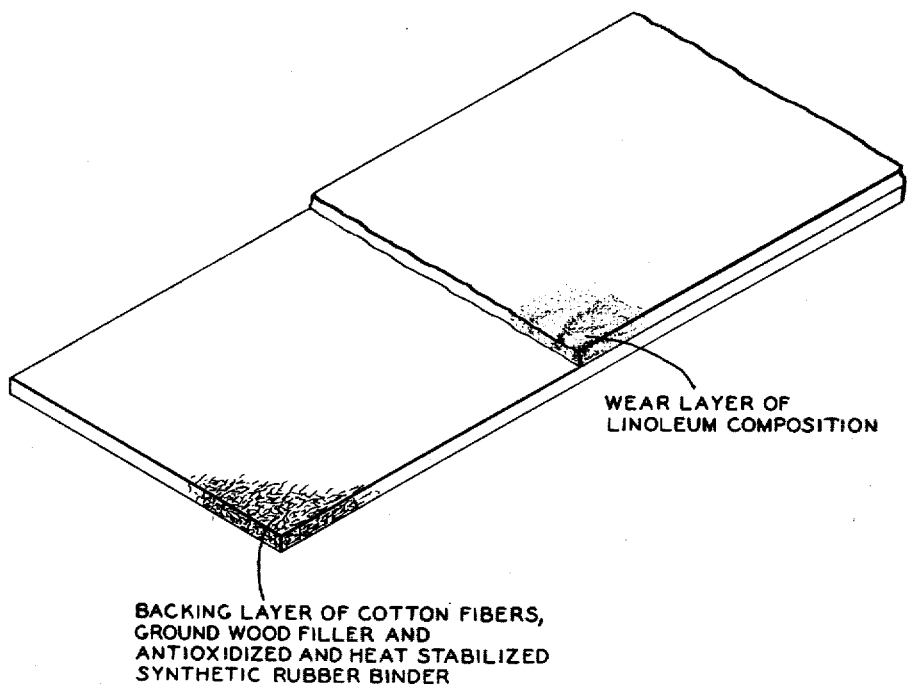
WEAR LAYER OF LINOLEUM COMPOSITION
BACKING LAYER OF COTTON FIBERS, GROUND WOOD FILLER AND ANTIOXIDIZED AND HEAT STABILIZED SYNTHETIC RUBBER BINDER
*INVENTOR*
JOHN W. BAYMILLER
DAVID A. FEIGLEY, JR.
ATTORNEY

United States Patent Office 2,802,765
Patented Aug. 13, 1957

2,802,765
SURFACE COVERING

John W. Baymiller, Manheim Township, and David A. Feigley, Jr., Lancaster Township, Lancaster County, Pa., assignors to Armstrong Cork Company, Lancaster, Pa., a corporation of Pennsylvania Application April 27, 1956, Serial No. 581,007

10 Claims. (Cl. 154—49)

This invention relates to surface coverings. It is concerned more particularly with the manufacture of linoleum having a backing or foundation in the nature of a water-resistant felted fibrous sheet.

The backing used in the manufacture of linoleum was customarily burlap, but in recent years felt saturated with a waterproofing impregnant such as asphalt, tall oil, synthetic rubber, and the like has been used extensively.

A backing to be fully satisfactory for use on linoleum and other surface coverings should possess the following characteristics:

1. It must have adequate strength to prevent distortion when subjected to the stresses encountered in calendering, pressing, and other consolidating operations and, of course, the lesser but significant stresses which are developed in other fabricating operations such as in pulling the material through the various operating stations and in stoving where the material may be hung in festoons 90 feet high during curing. The problem of open seams between inlays resulting from distortion of the backing layer also is a problem of considerable magnitude with patterned inlaid linoleum.

2. It must be dimensionally stable under moisture conditions. Linoleum is generally cemented to the floor with a water-soluble paste. If the backing is susceptible to dimensional changes upon contact with moisture, it will expand after being brought into engagement with the paste, but the linoleum composition layer will remain constant. As a result, the covering will curl upwardly and peaked seams will form where adjacent pieces of the linoleum are fitted together.

3. The backing must be sufficiently resistant to indentation to avoid objectionable marking of the linoleum layer by the legs of articles of furniture, such as chairs, tables, and the like.

4. It must be substantially homogeneous and free from any tendency for particles to be "picked out" from the backing and transferred to the face of the linoleum composition during fabrication, particularly where the material is moved over stationary guide rolls and the like and considerable frictional resistance is offered. This is not a serious problem with so-called molded linoleum and similar surface coverings where the linoleum composition is deposited upon the backing through stencils. It is a more important factor in calendered and so-called rotary or straight line inlaid linoleum.

5. It must be readily severable with conventional linoleum installation tools, providing a clean, smooth cut so that when adjacent pieces of the linoleum are installed, a good, tight, invisible joint will be obtained.

6. It must be proof against staining of the linoleum composition wear layer applied thereto. This staining generally occurs during stoving or heat curing of the linoleum composition and is believed to be due to the presence of wool or other protein based fibers in the rag furnish used in the preparation of the felt for the backing. This staining is peculiar to linoleum and is not encountered in other plastic surface coverings such as the vinyl chloride plastic type.

7. It must be resistant to age hardening, particularly during stoving operations where elevated temperatures are employed to cure the linoleum composition.

The principal object of the invention is to provide a backing having the properties outlined above made from a water-laid, fibrous felt sheet saturated with a synthetic rubber dispersion, preferably incorporated into the fibrous slurry and deposited onto the fibers prior to sheet formation.

According to the present invention, the furnish for the felt consists essentially of a combination of fibers including beaten cotton fibers and a filler composed of ground wood, preferably newsprint fibers, but optionally wood flour or a mixture of both. The binder consists essentially of a synthetic rubber, preferably a butadiene-styrene type because of its low cost. The rubber is antioxidized and heat-stabilized with an antioxidant. The antistaining agent, if one be used, preferably consists of a tanning agent for the heat stabilization of any wool or other protein-containing materials present in the furnish. The wear layer may be linoleum composition, vinyl chloride plastic composition, oil paint, rubber composition, or other material.

The invention is illustrated in the accompanying drawing in which the single figure is a diagrammatic perspective view of a piece of linoleum floor covering embodying the invention. The appropriate identifying legends have been applied to the elements shown in the drawing.

The invention may be practiced by following the example below:

Example 1

| | |
|---|---|
| Cotton fibers (Cottonades) | 75.0 |
| Ground wood filler (old newspapers) | 25.0 |
| Synthetic rubber (GR–S) (dry basis) | 30.0 |
| Antioxidant (Agerite White) | 0.3 |
| Antistaining agent (dextrose) | 6.5 |

All parts by weight.

Cottonades are a grade of rags composed essentially of new cotton cuttings obtained from garment manufacturing operations. Commercially there may be some contamination of these cuttings with minor amounts of wool and other fibrous materials.

The preferred ground wood filler is repulped newspapers. They are a ready source of reinforcing fibers and are inexpensive. Virgin newsprint pulp may be used, of course. Newsprint consists essentially of mechanical soft wood pulp to which is added a small quantity of sulphite pulp, generally from 10% to 20% of the total fiber, based on dry solids. The term "newsprint pulp" is used to define both the virgin stock as well as the repulped paper.

The GR–S synthetic rubber may be a copolymer of butadiene and styrene containing 50% butadiene and 50% styrene. Any commercial grade of GR–S rubber may be substituted, however, for the ratio of butadiene to styrene is not critical. For best results, the ratio will be within the order of 45 and 55 parts of butadiene and 45 and 55 parts of styrene.

Agerite White is di-beta-naphthyl-paraphenylenediamine.

The cotton fibers form a strong, dimensionally stable base component for the felt. The newsprint pulp functions as a reinforcing filler, providing the hardness, strength, and rigidity necessary for good handling during linoleum production operations without "pickout" that causes dirtiness of the linoleum face. This component also contributes good indentation resistance and improved cutting properties to the finished product. As mentioned above, for some kinds of surface covering, this "pickout" is not a problem, and this permits the substitution of wood flour for all or a part of the newsprint pulp, as will be more fully hereinafter described.

The GR–S rubber antioxidized and heat-stabilized with the Agerite White provides a stable binder that will not harden or deteriorate either during the heat of normal linoleum curing or stoving or during subsequent room temperature aging.

In the preparation of the composition, the cottonades are beaten and reduced to a fibrous pulp. The newsprint is formed into a water slurry and combined with the beaten rag fibers. Both the rag fiber and wood may be beaten together, if desired. A slurry containing about 100 parts of cottonades and newsprint pulp may contain about 10,000 parts by weight of water. To this slurry may be added 12 parts by weight of alum which serves to sensitize the fibers for the deposit of the GR-S rubber. The slurry is agitated to disperse the alum throughout the solution. About 10 parts by weight of aqueous ammonia (28%) are then added to convert the alum to aluminum hydroxide. Thereafter the 30 parts by weight of butadiene-styrene synthetic rubber dispersion are added. The resulting slurry is agitated to coagulate the rubber onto the fibers. The slurry of coated fibers is then formed into a sheet on a paper machine.

The dextrose serves as an antistaining agent to prevent stove staining of the linoleum mix. It functions by heat stabilizing any wool or other proteinaceous materials that may be present as contaminants in the cottonades of the furnish. The dextrose is applied to the upper surface at least of the formed sheet to which the linoleum mix is to be bonded and is preferably in the form of an aqueous solution of about 30% concentration. It may be applied with a roller coater or spray, preferably between the first and second wet presses of the papermaking machine on which the sheet is formed.

After drying, the sheet is ready for use as a backing for a linoleum or other wear layer. The linoleum composition may be applied by strickling it onto the face of the backing layer, a so-called molded inlaying process, by calendering the linoleum mix on the backing as in the manufacture of plain-colored sheet products, by applying sheeted inlays to the backing and consolidating them thereon, or by other techniques. After the linoleum layer has been consolidated onto the backing layer, the material is delivered to a stove for curing. With a layer of linoleum composition about .050" thick, heating may be accomplished for about 10 days at about 185° to 210° F. With some of the other plastic surface coverings, such as those made from vinyl chloride compounds, curing is not required.

The following is an example of a backing which contains wood flour as the ground wood component:

*Example II*

| | |
|---|---|
| Cotton fibers (Cottonades) | 75.0 |
| Ground wood filler (250 mesh wood flour)[1] | 25.0 |
| Synthetic rubber (GR–S) (dry basis) | 30.0 |
| Antioxidant (Flectol H) | 0.6 |
| Antistaining agent (alum) | 2.6 |

All parts by weight.

[1] Substantially all of the particles will pass through a 250 mesh U. S. standard sieve.

The backing sheet may be formed in the same manner as in Example I.

The following table shows some of the more important physical properties of a backing felt of .043" thickness made in accordance with Examples I and II:

| | Example I | Example II |
|---|---|---|
| Pull per lineal inch at break | 1,800 lbs./sq. in. | 1,200 lbs./sq. in. |
| Percent elongation at break | 2–3% | 2–3% |
| Stiffness [1] | 16.2% | 10.7%. |
| Bend-Break Angle [2] | 27° | 90°+. |
| Dimensional Change [3] | .83% | .79%. |

[1] Measured as percent of a two-inch pound load required to bend a test specimen through an angle of 20°.
[2] Measured as angle of bend of a test specimen 1" wide where cracking of surface of specimen occurs.
[3] Sum of dimension changes of test specimen taken in machine direction and across machine direction.

From this table it will be clear that the newsprint reinforced felt is superior to the wood flour filled product in tensile strength measured in terms of pull per lineal inch at break. The wood flour filled product is, however, more flexible as measured by stiffness and bend-break angle. Both are excellent in dimensional stability. The wood flour filled product is fully strong enough for molded inlaid products as discussed above. For calendered and rotary or straight line inlaid products, the newsprint pulp reinforced product will be preferred or one which combines a portion of the wood flour with the newsprint pulp, say 60% newsprint pulp and 40% wood flour.

While the above examples give preferred formulas for the various ingredients, some latitude is available in proportioning. In the base fibrous composition, the cottonades may constitute 60% to 80% and the ground wood filler 40% to 20% of the base furnish. Generally about 15 to 40 parts by weight of the synthetic rubber are employed for each 100 parts by weight of the fibrous base furnish. The antioxidant and heat stabilizer is usually applied in the proportion of .1 to 1.6 parts by weight for each 15 to 40 parts by weight of synthetic rubber. The antistaining agent application may be at the rate of about 2 to 10 pounds per 10 pounds of dry felt treated.

In the above examples, the essential components are (1) cotton fibers, (2) ground wood filler, (3) synthetic rubber, (4) an antioxidant and heat stabilizer for the rubber, and optionally (5) an antistaining agent for any proteinaceous contaminant in the furnish. The following table lists specific components which may be used, singly or in combination:

1. Cotton fibers:
    (a) Cottonades
    (b) Cotton rags
    (c) Cotton linters
2. Wood fibers:
    (a) Virgin newsprint
    (b) Old newspapers
    (c) Wood flour
3. Synthetic rubber:
    (a) Butadiene-styrene
    (b) Butadiene-acrylonitrile
    (c) Butadiene-vinyl toluene
4. Antioxidant and heat stabilizer:
    (a) Di - beta - naphthyl - paraphenylenediamine (Agerite White)
    (b) Polymer of 1,2-dihydro-2,2,4 trimethylquinoline (Flectol H)
    (c) Mixture of mono- and diheptyl diphenylamines (Agerite Stalite)
5. Tanning agent:
    (a) Alum
    (b) Dextrose
    (c) Formaldehyde

We claim:
1. A surface covering comprising a wear layer bonded to a backing layer comprising the felted and dried residue of 100 parts of a furnish containing 60–80 parts of hydrated cotton fibers and 40–20 parts of ground wood filler, said 100 parts of furnish having uniformly deposited thereon 15–40 parts of the coagulated residue of a dispersion of synthetic rubber material antioxidized and heat-stabilized with an antioxidant, all parts being by weight on a dry basis.

2. A surface covering comprising a wear layer of linoleum composition bonded to a backing layer comprising the felted and dried residue of 100 parts of a furnish containing 60–80 parts of hydrated cotton fibers containing proteinaceous material as a contaminant and 40–20 parts of ground wood filler, said 100 parts of furnish having uniformly deposited thereon 15–40 parts of the coagulated residue of a dispersion of synthetic rubber material antioxidized and heat-stabilized with an antioxidant, all parts being by weight on a dry basis, the surface of said felt to which said linoleum layer is bonded being characterized by the substantially complete tanning of said proteinaceous material disposed at said surface which renders said backing layer antistaining to said linoleum composition wear layer.

3. A surface covering in accordance with claim 1 in which the ground wood component comprises newsprint pulp.

4. A surface covering in accordance with claim 1 in which the ground wood component consists essentially of newsprint pulp.

5. A surface covering in accordance with claim 1 in which the ground wood component consists essentially of wood flour.

6. A surface covering in accordance with claim 1 in which the synthetic rubber component comprises a butadiene-styrene copolymer.

7. A surface covering in accordance with claim 6 in which the copolymer contains from 45% to 55% butadiene and from 55% to 45% styrene.

8. A surface covering in accordance with claim 1 in which the antioxidant is selected from the group consisting of di - beta - naphthyl - paraphenylenediamine, 1,2 - dihydro - 2,2,4 trimethylquinoline, monoheptyl diphenylamine, diheptyl diphenylamine, and mixtures thereof.

9. A surface covering in accordance with claim 2 in which the antistaining agent is selected from the group consisting of alum, dextrose, formaldehyde, and mixtures thereof.

10. A surface covering in accordance with claim 9 in which the antistaining agent comprises alum.

References Cited in the file of this patent

UNITED STATES PATENTS

| | | |
|---|---|---|
| 1,870,567 | Hill | Aug. 9, 1932 |
| 2,307,639 | Quinn et al. | Jan. 5, 1943 |
| 2,720,472 | Baymiller | Oct. 11 1955 |

OTHER REFERENCES

"Antioxidants," Synthetic Rubber by G. S. Whitby, C. C. Davis and R. F. Dunbrook, page 417, published 1954 by John Wiley & Sons, Inc., New York.

UNITED STATES PATENT OFFICE

CERTIFICATE OF CORRECTION

Patent No. 2,802,765                                         August 13, 1957

John W. Baymiller et al.

It is hereby certified that error appears in the printed specification of the above numbered patent requiring correction and that the said Letters Patent should read as corrected below.

Column 3, lines 44 and 45, for "With some of the other plastic surface coverings, such as accomplished for about 10 days at about 185° to 210° F." read -- accomplished for about 10 days at about 185° to 210° F. With some of the other plastic surface coverings, such as --; column 4, line 24, for "10 pounds", second occurrence, read -- 100 pounds --.

Signed and sealed this 1st day of October 1957.

(SEAL)
Attest:
KARL H. AXLINE
Attesting Officer

ROBERT C. WATSON
Commissioner of Patents